Figure 4:
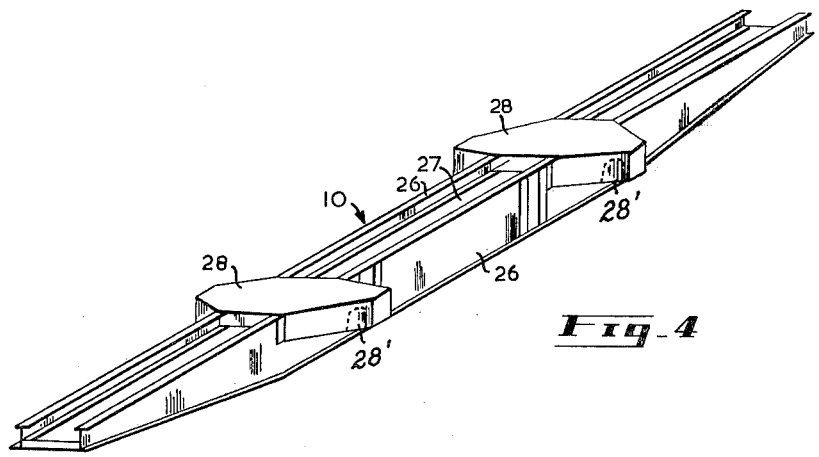

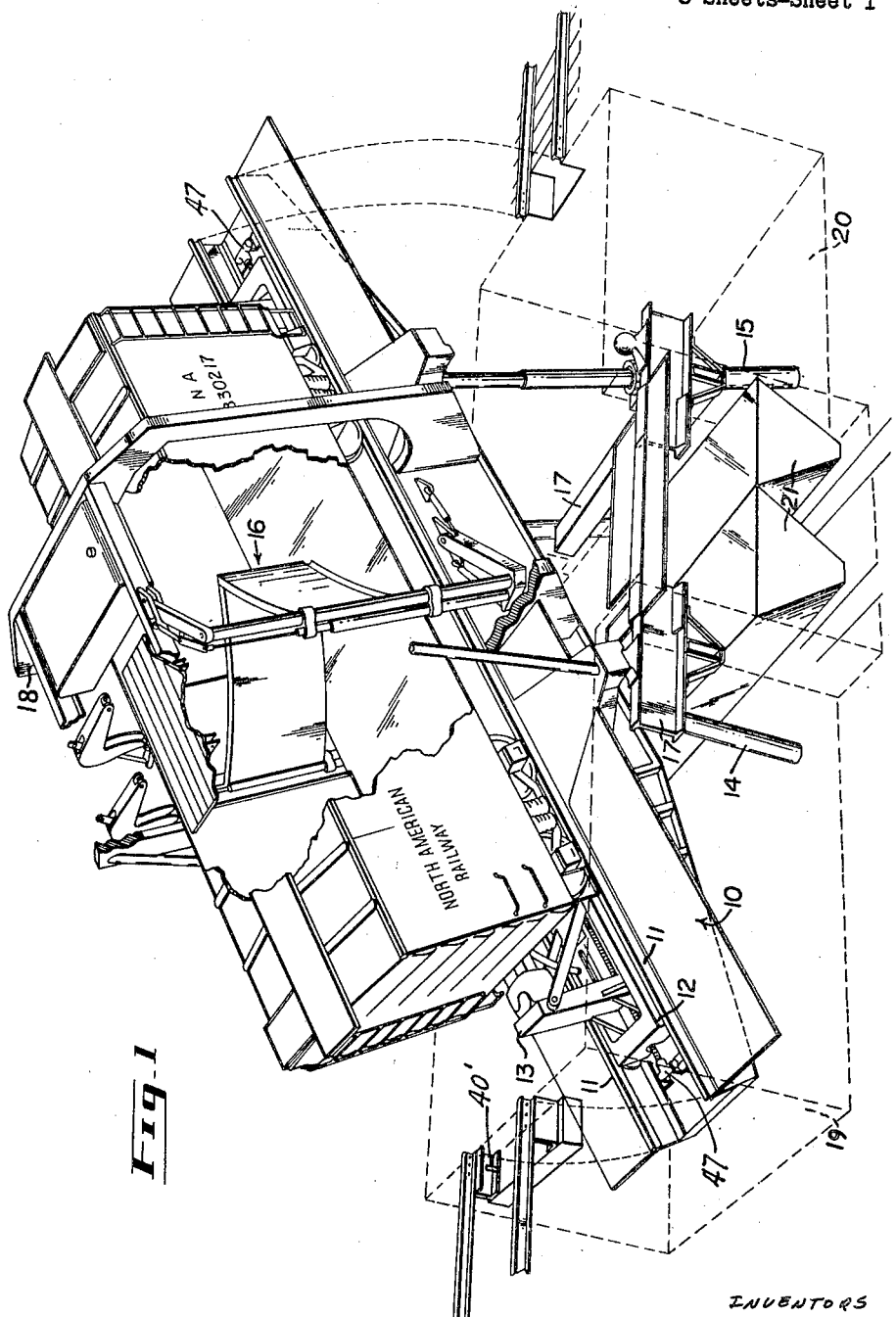

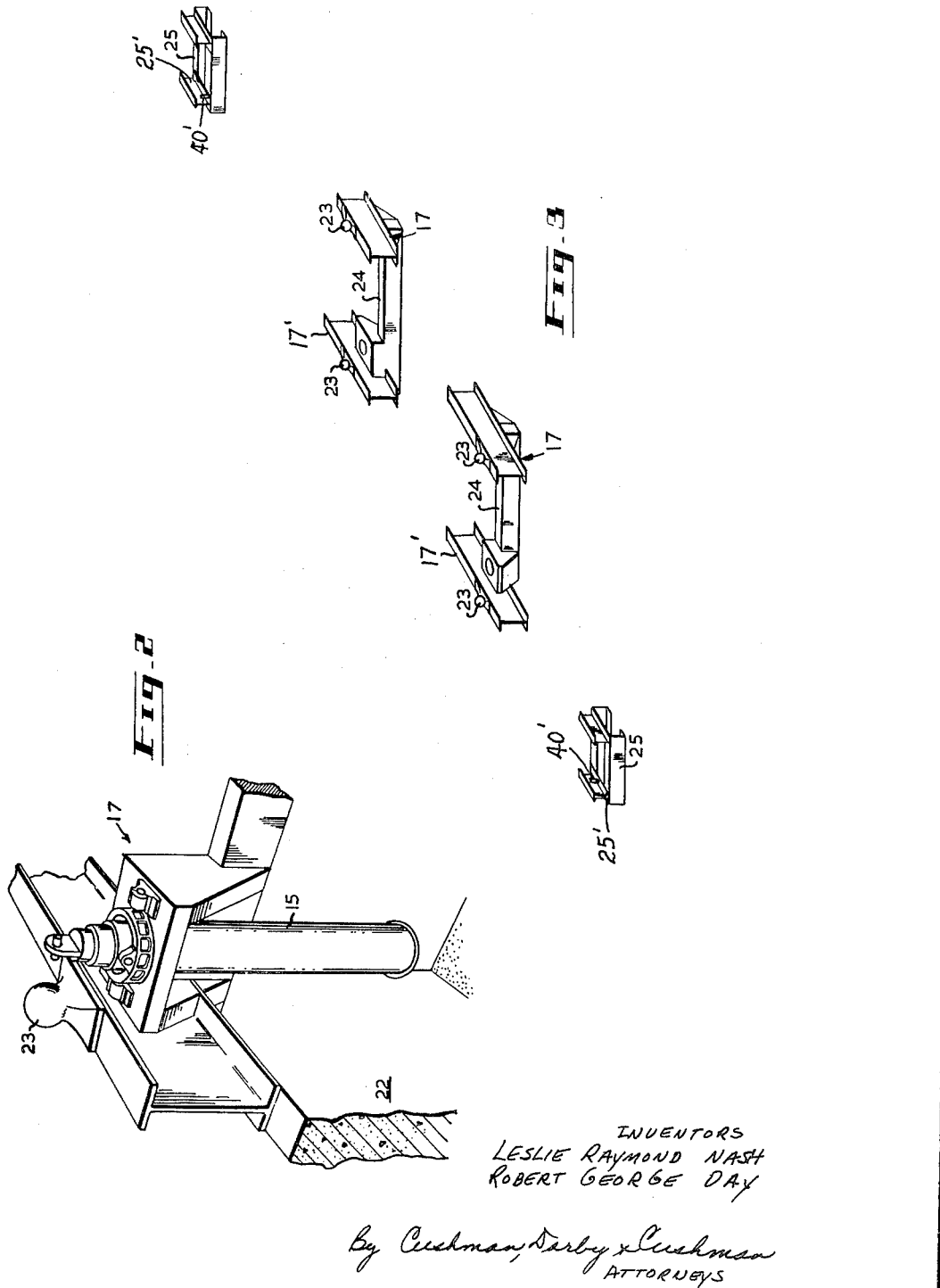

June 22, 1965  L. R. NASH ETAL  3,190,472
GRAIN DUMPER

Filed June 13, 1963  8 Sheets-Sheet 3

INVENTORS
LESLIE RAYMOND NASH
ROBERT GEORGE DAY

By Cushman Darby & Cushman
ATTORNEYS

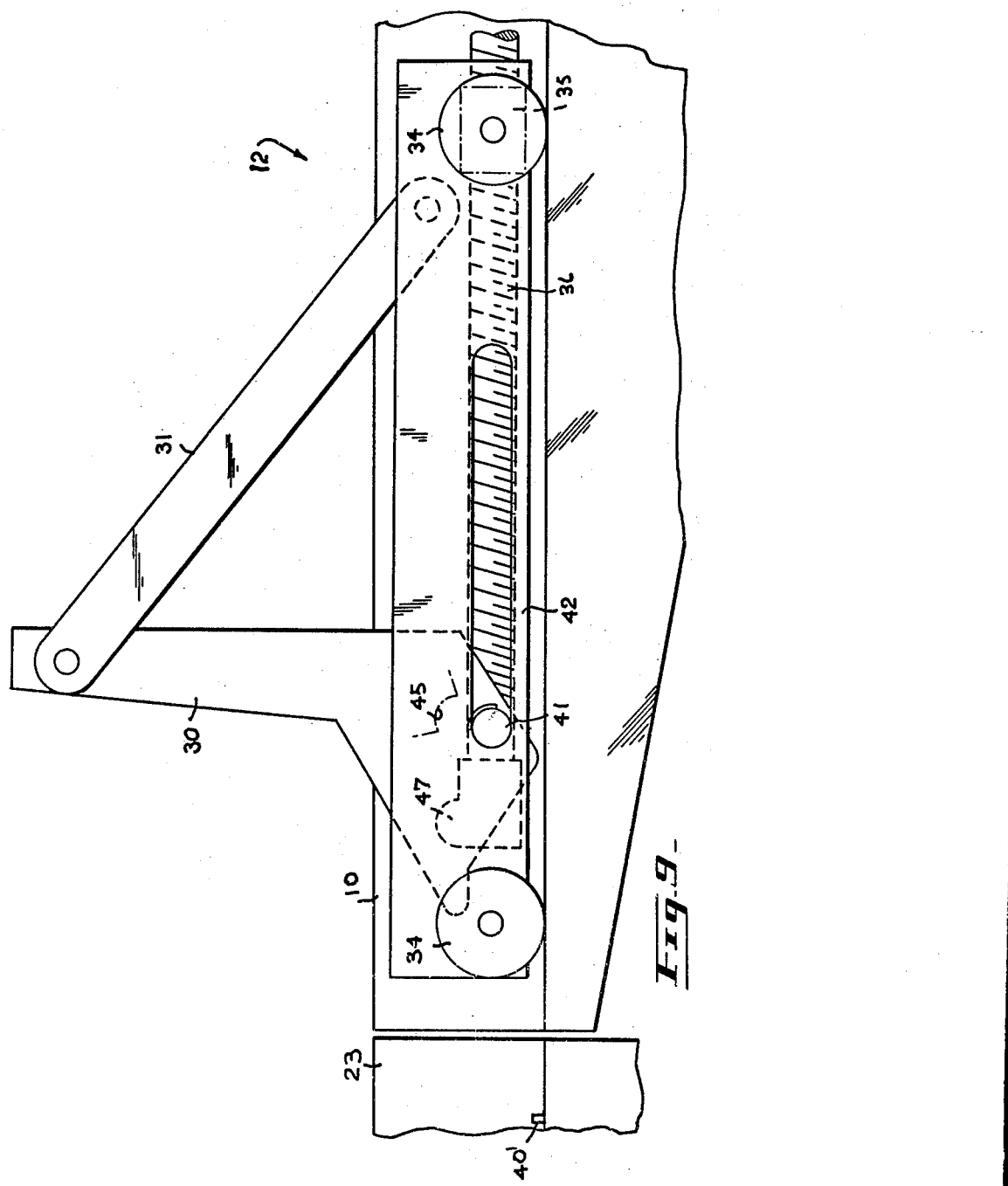

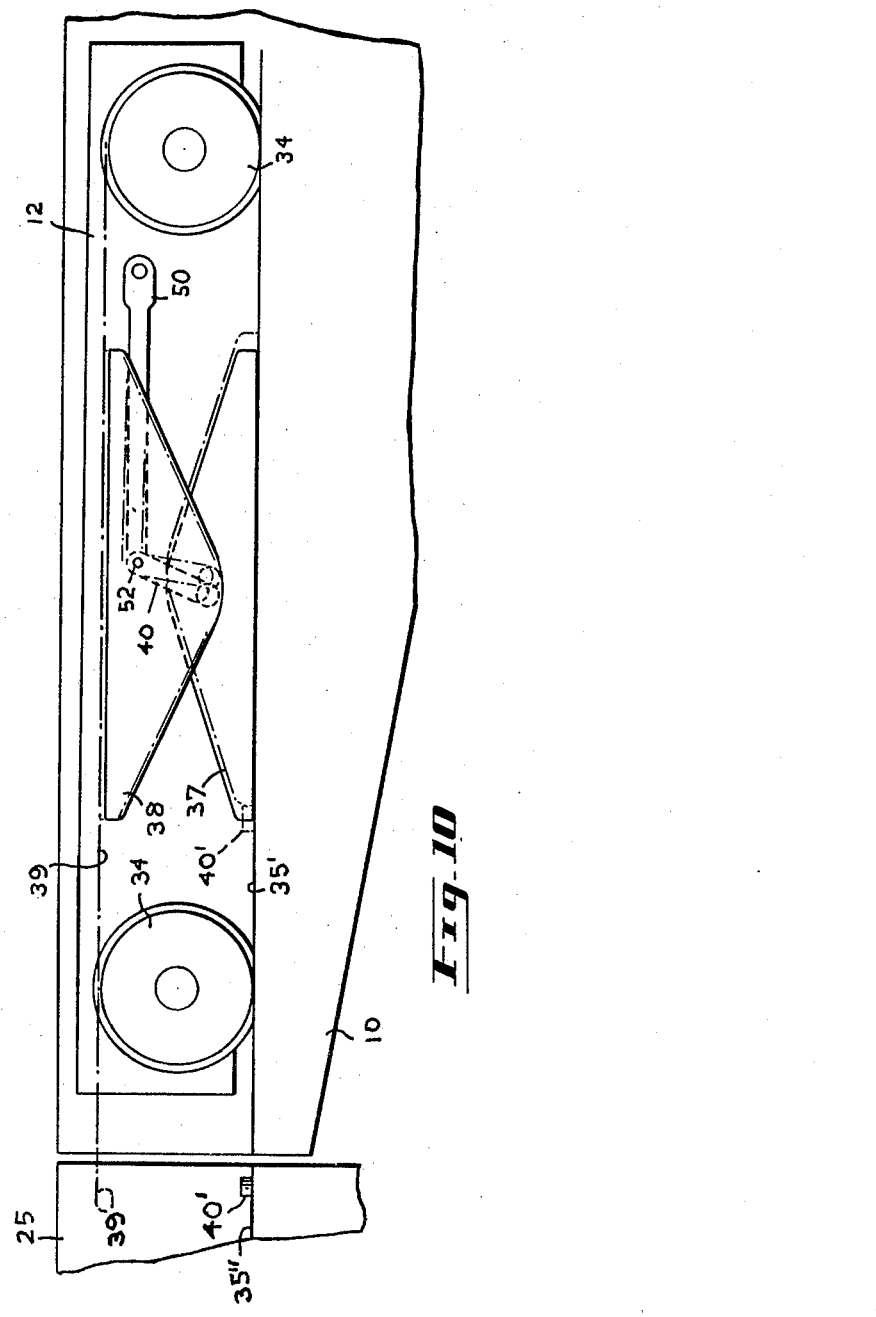

United States Patent Office 3,190,472
Patented June 22, 1965

3,190,472
GRAIN DUMPER
Leslie R. Nash and Robert G. Day, Port Arthur, Ontario, Canada, assignors to Seabar Equipment Ltd., Ontario, Canada
Filed June 13, 1963, Ser. No. 287,680
Claims priority, application Canada, Apr. 3, 1963, 872,420
3 Claims. (Cl. 214—47)

The present invention relates to an improved apparatus for dumping granular materials from box cars and in particular to an improved tiltable cradle structure having combined car-locking and cradle clamping means.

In North America, granular substances, such as grain, are commonly shipped in box cars which are provided with grain doors mounted from inside the car, in addition to normal freight car doors. In order to empty the grain from one of these cars after it has been filled, it is necessary in some manner to remove a grain door and permit the grain to be emptied through the side door of the car.

The early devices for emptying grain from box cars merely mechanized the hand unloading which had been used prior to that time. These devices permitted a man to remove an appreciably greater amount of grain for the same amount of effort than previously. With the increase in the amount of grain handled through port facilities, it became essential that automatic means be developed for emptying the grain from box cars with a minimum of time and manual labor. It will be appreciated that when grain is emptied from the car by machinery used for this purpose, that the car should be left in completely clean condition so that no manual labor is required to clean the car after the car has left the machine.

One device for carrying out this purpose consisted of a cradle for supporting the box car which was mounted over a hopper and was adapted to be tilted transversely to the long axis of the car so that the grain would be emptied from the car through one door. It was found that these devices would not completely empty the grain from the car. Accordingly, vibrators and other devices were added to the basic machine in an attempt to improve its operation. Side tilt dumpers have not proven to be satisfactory in practice since they do not quickly and completely remove the grain from a box car. Further, the railways have objected to their use since the oil contained in the journals of the car axles tends to be poured out when the car is tipped sideways.

End tilt dumpers have also been developed. Prior to the present invention, these end tilt dumpers were provided with a cradle on which the car was mounted, means for tilting the cradle, means for opening the grain doors of the box car, and deflectors which were inserted into the open doors to deflect the grain through the side doors of the car and into a hopper positioned beneath the cradle. Some end tilt dumpers have also been provided with side tilt to improve the operation of these machines.

A known machine for removing the grain from box cars and incorporating a tiltable cradle is the end tilt machine of the type described in United States Patent No. 2,797,000, issued to the Winter Dump Co. Ltd., on June 25, 1957, in which no side tilt is used.

The present invention provides improvements over known forms of end tilt grain dumpers such as the Winter device in an improved foundation and cradle structure as well as an improved car clamp for holding the box car in position on the cradle while it is being tilted and which, when the cradle is in its horizontal position, may be unclamped and form a locking mechanism to hold the cradle stable while freight cars are being moved onto and off of the cradle.

Preferably, the cradle tilting means comprises, pairs of cylinders mounted on the foundation and adapted to be extended to raise an end of the cradle. The operation of each pair of cylinders will be so correlated that only one end of the cradle will be lifted at a time, to effect tilting of the cradle and the discharge of the grain from the box car.

The cradle is constructed and arranged to be mounted on top of the foundation and to form a continuation of the railway track leading to the dumper. The cradle comprises, a pair of vertically positioned longitudinally extending I-beams of varying depth which are interconnected by continuous panel surfaces to form a box beam cradle structure of hollow cross-section. This box beam is useful for storing operating equipment such as the electric and hydraulic equipment, so that no separate or remote pump or power room is used as on certain known machines. The longitudinal I-beams of the cradle are adapted to fit between the longitudinal members or side walls of the foundation. The cradle is provided with lateral extensions which house main pivot bearing sockets and which are adapted to cooperate with spherical pivot bearings or bollards mounted on the foundation to permit the cradle to be tilted. Since the cradle is provided with two sets of bollards, it will be appreciated that the depth of the pit beneath the cradle to allow for movement of the lowered end of the cradle is less than would be required.

The grain dumper, in accordance with the present invention, also requires a minimum width for installation. Thus, there is no lost space in most existing track sheds when the dumper of the invention is installed, and there is a minimum of interference with track shed columns and changes to existing pit hoppers. Similarly, a minimum size of track shed is required for any new installations using the dumper of the present invention.

All free flowing bulk commodities such as grain, sulphates and fertilizers, can be unloaded with the apparatus of the present invention. Further, all standard type box cars in use in Canada and the United States can be unloaded.

The cradle, in accordance with the present invention, is provided with a combination car-clamp and cradle-lock assembly. This assembly in one position provides a lock firmly to fix the cradle to the foundation so as to form a bridge therebetween and to prevent any tilting motion while cars are being shunted onto and off the cradle, and in its other position this assembly firmly and rigidly locks the car in centered position on the cradle while, at the same time, unlocking the ends of the latter from the adjacent foundation. If the car is not originally centered on the cradle when the car locks commence their motion to lock the car in position, the car-locks will automatically center the car during the locking operation. These car-lock cradle clamp assemblies are mechanically operated by a reversible driven shaft.

Figure 5:
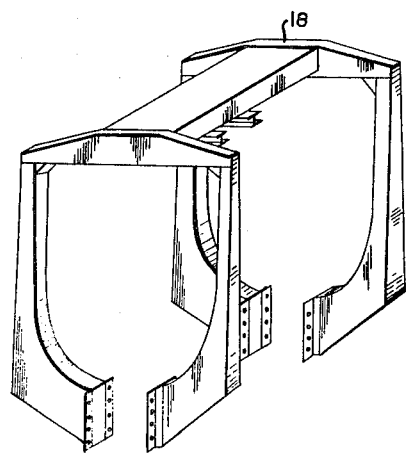
Figure 6:
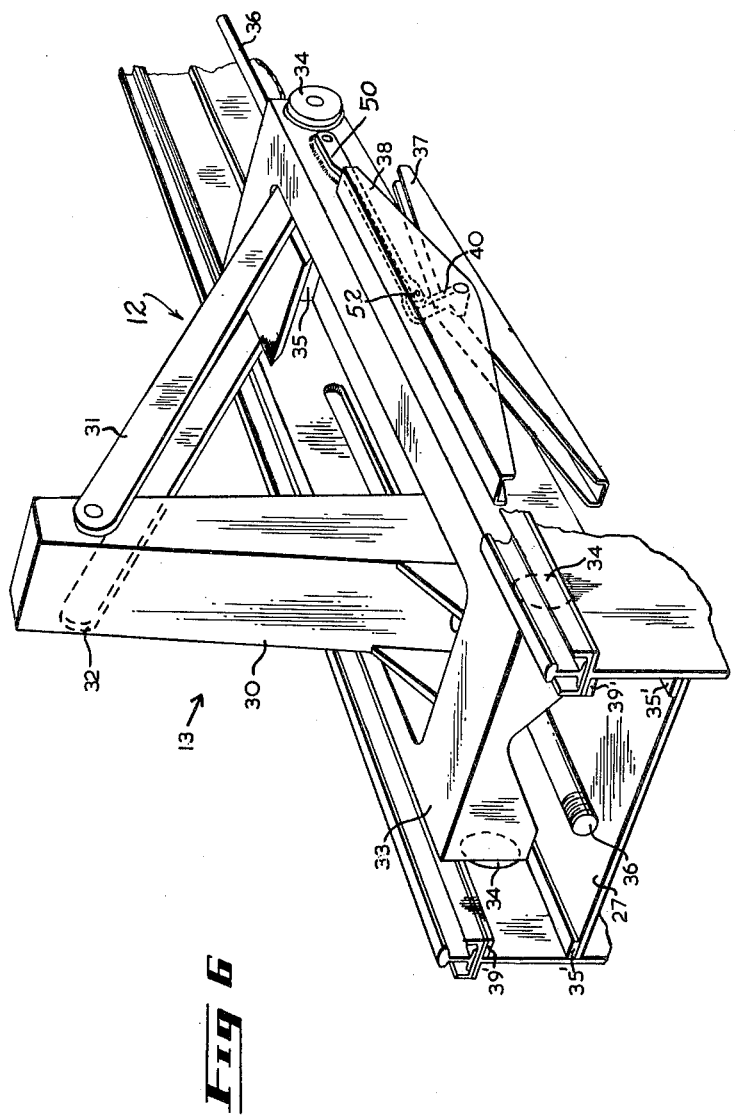
Figure 7:
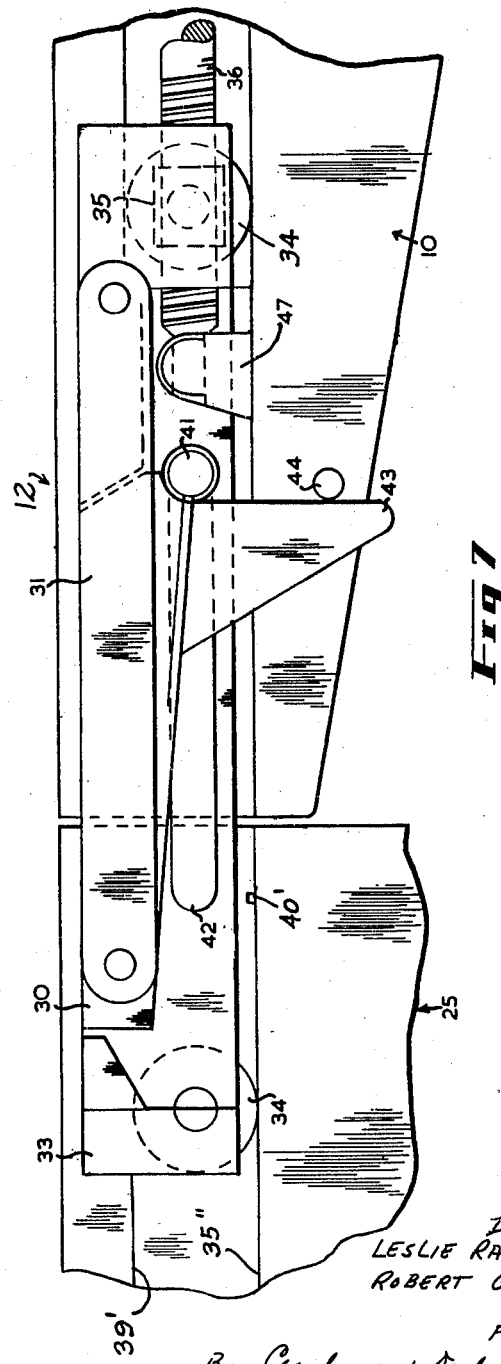
Figure 8:
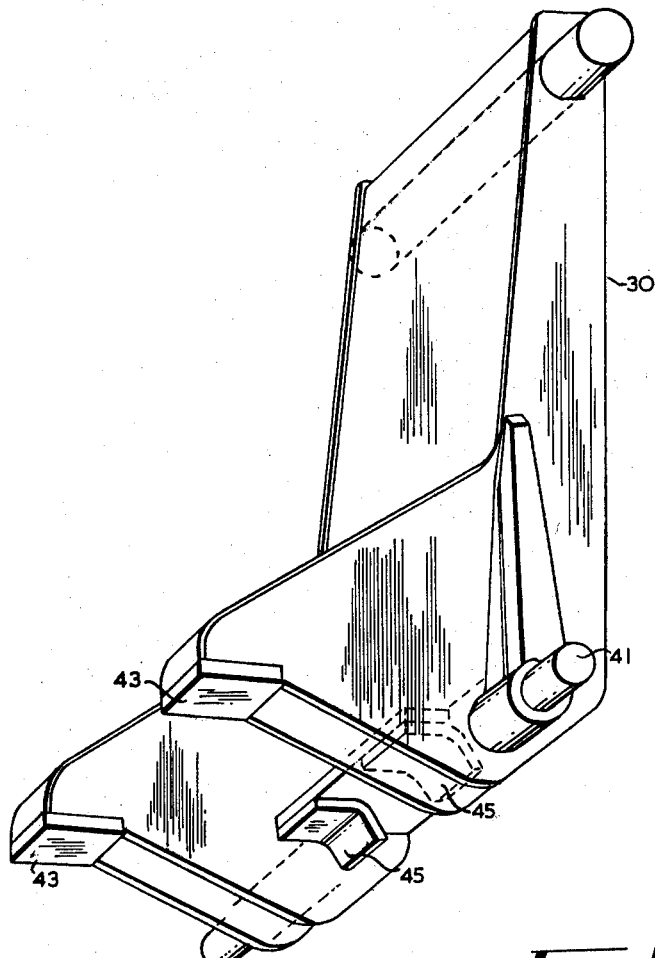

In drawings which illustrate an embodiment of the invention;

FIG. 1 is a perspective view of the grain dumper in accordance with the present invention, being used to dump the grain from a box car, FIG. 2 is a partial perspective view, showing the main pivot and tilting cylinder, FIG. 3 is a perspective view of the foundation constructed in accordance with the present invention, FIG. 4 is a perspective view of a cradle showing the box structure and pivot members, FIG. 5 is a perspective view of the arch structure showing its method of attachment to the cradle, FIG. 6 is a perspective view of a car-clamp and cradle-lock constructed in accordance with the invention, FIG. 7 is a profile view of the clamp stowed and cradle-locked, FIG. 8 is a perspective view of the clamp post of the car-clamp, as shown in FIG. 6.

FIG. 9 is a profile view of the assembly of FIG. 7 showing the clamp in its erected position; and FIG. 10 schematically illustrates the operation of elements of the cradle lock.

As shown in FIG. 1, an end tilt grain dumper in accordance with the present invention comprises, a cradle 10 having a pair of rails 11 on which the railway car is carried, a cradle clamp trolley 12 mounted for reciprocal movement in a channel 9 of the cradle 10, a coupler engaging member or clamp 13, hydraulic cylinders 14 and 15 a baffle structure indicated generally at 16 is also shown and forms the subject matter of a copending application Serial No. 288,078, filed June 17, 1963.

The cradle 10 is mounted on a pair of beam structures 17 on the side walls of the grain receiving pit and they form the main supports of the foundation for the grain dumper. Well assemblies 25 in the end walls of the pit support terminal ends of tracks leading up to the dumper, as shown. The cradle 10 is also provided with an arch structure 18 from which a grain door opener mechanism is suspended. As shown in the view of FIG. 1, clearance pits 19 and 20 are provided to accommodate the ends of the cradle when grain is being dumped from the box car into hoppers 21 provided beneath the central portion of the cradle 10.

As shown in the fragmentary view of FIG. 2, the beam structures 17 are supported by a concrete side wall 22 and the longitudinally extending members 17' of each structure 17 are provided with a spherical bollard or pivot 23 that is mounted on members 17' adjacent the hydraulic cylinder assemblies 14 and 15 and which are adapted to carry the weight of one end of the cradle when the opposite end of the cradle is lifted. The hydraulic cylinder 15 is also adapted in turn to lift the cradle so that the car carried thereon may be tilted for dumping the grain and may be pivotally connected in known manner to the lower surface of the cradle 10.

FIG. 3 is a perspective view of elements of the foundation structure for the end tilt grain dumper showing the beam structures 17, the four spherical pivots 23 and transverse members 24 on which the hydraulic cylinders 14 and 15 are mounted. End clamp well assemblies 25 are also provided at opposite ends of the grain dumper in the end walls of the pit as shown in FIG. 1 and provide a support for the rails on which the box car will travel, as well as providing channels into which portions of the trolleys 12 are moved.

FIG. 4 is a perspective view of the cradle structure 10 of the present invention and from this view it will be seen that the cradle 10 consists generally of a box structure having a pair of longitudinally extending vertical sides 26, an upper surface 27 and a lower surface, not shown. The beams 26 are tapered toward the outer ends thereof in order to minimize the weight of the cradle since the load on the outer ends of the cradle 10 is less than the load on the central portion.

Transversely extending wing members 28 are provided on the cradle and house sockets 28 (shown in pecked line) that are adapted to cooperate with the spherical pivots 23 on the foundation to permit the tilting of the cradle. It has been found that the use of ball and socket pivots in place of axles and yokes of the prior art greatly improves end alignment of cradle 10 with the adjacent tracks when the cradle is lowered to remove or receive a freight car.

FIG. 5 shows the arch structure 18 which is fastened to the cradle and which serves to support the grain door opener (not shown) and the hydraulic reservoir used for actuation of the dumper.

FIGS. 6 and 7 show in detail the trolley 12 and car clamp 13 illustrated in FIG. 1. This car clamp serves a dual purpose in that it centers and clamps the car on the cradle in a first or erected position, and in its second or stowed position serves to lock the cradle to the well assemblies 25 of the foundations on either end wall of the pit, so that the track on the cradle is correctly aligned with the track leading up to the cradle. This car-clamp consists of a clamp post 30, slidably and pivotally mounted at its lower end, by means of pins 41 riding in slots 42, to the carriage of the trolley 12, a pair of tie members 31 and 32, connecting the upper end of the post 30 to the forward end of the trolley. The latter is mounted on wheels 34, and includes a universally mounted nut 35 engaging a threaded shaft 36 driven from a central portion of the cradle 10 by motor means (not shown). The wheels 34 of the trolley 33 are adapted to ride on the flanges 35' and 39' of the trolley 12 as shown as well as in the corresponding flanges 35'' and 39' in the well assembly 25 (FIG. 7). A cradle lock consisting of a pair of movable shoes 37 and 38, provided on and suspended from each side of each trolley 12 and adapted to engage the flanges 35' and 39, in a locking action. Shoes 37 and 38 are coupled together by an eccentric arm 40 which is actuated by a pin 40' mounted in the well 25 on the foundation beyond the end of the cradle as shown in FIGS. 7 and 9 and which causes the shoes 37 and 38 to be spread apart and to engage the flanges 35 and 39 to form a rigid lock bridging the cradle to the end assemblies 25. The shoes 37 and 38, together with the eccentric rod 40, are suspended from the trolley 12 by a suspension arm 50.

FIG. 7 illustrates the car clamp in its second or stowed position with the cradle locked to the well assembly 25. The cradle locks are not shown for simplicity in FIG. 7 but their action may be contemplated from FIG. 10. In FIGS. 7 and 9, it will be noted that each pivot pin 41, which runs in slot 42, is at its extreme right-hand position when the car clamp is stowed and when the car clamp is erected, pin 41 is in the extreme left-hand position of slot 42. The trolleys 12 are drawn inwardly from their locking positions with their associated well assemblies 25 towards the center of the cradle 10 to be positioned for clamping by the action of the rotating threaded shaft 36 on the universal nut 35. Clamp post 30 is provided with a pair of projections 43 which engage pins 44 mounted on the cradle 10 and which cause the clamp post 30 initially to rotate in a clockwise direction about the pivots 41, thus causing the clamp post 30 to raise toward a vertical position. Rotation of shaft 36 draws the trolleys 12 inwardly towards one another thereby to center the freight car on the cradle and to clamp it in position.

As shown in FIG. 8, the clamp post 30 is provided, inwardly of the projections 43, with a pair of guide members 45 which are adapted to be engaged by a bearing or pillow block 47 (FIGURES 1, 7 and 9) when the trolleys 12 are drawn toward or away from the terminal ends of the cradle 10. As shown in FIGURE 1, when the trolleys and their clamps are positioned so as to centre a freight car on the cradle, the pillow blocks 47 are beyond the end of the trolleys. It will be appreciated, of course, that the pillow blocks 47 and their associated shafts 36 do not move longitudinal with respect to the cradle but that the trolleys 12 move on the shafts 36. When the trolley 12 is in a bridging position with its adjacent well assembly 25 and the clamp post 30 is in its stowed position, as shown in FIGURE 7, the trolley 12 is drawn inwardly towards the center of the cradle and the post 30 is erected in the following manner. Shaft 36 is rotated by its drive means and its threaded portion, acting on the nut 35, pulls the trolley out of the well assembly 25 and completely onto the cradle 10. In doing so, the projecting arms 33 on the post 30 initially are engaged by the pins 44 on the cradle 10 to swing the top of the post 30 in an upwardly direction about its pivot pins 41 in their slots 42. As the trolley 12 progresses inwardly toward the center of the cradle, the pillow block 47 engages the guide members 45 on the bottom of the post 30 which moves the pins 41 towards the left or outer end of their slots 42. Due to the top of the post being connected to the inner end of the carriage of the trolley 12 by tie members 31 and 32, the post 30 assumes an upright position normal to the trolley 12, as shown in FIGURE 9.

The guide members 45, as shown in FIGURE 8, are, in effect, collars which engage the pivot blocks up to the vertical position being assumed by the post 30 at which point they disengage from the pillow block 47 when the trolley is progressively drawn inwardly from the end of the cradle so that when the posts 30 engage eventually the couplers of a box car, the pillow blocks 47 have been freed from the trolleys 12, as shown in FIGURE 1.

The reverse of the above operation is carried out when the box car is being unclamped, e.g., the shaft 36 is rotated in the opposite direction; the pillow block 47 engages the guide members 45 to begin lowering the clamp post 30 by drawing its lower end along the carriage of the trolley so that the pins 41 progress towards the opposite end of their slots 42. After the pillow blocks 47 start the post towards its stowing position, the weight of the post itself effects its lowering into the position of FIGURE 7 so that at this point the ends of the cradle and the well assemblies 25 are bridged and the post is stowed so that the freight car can be removed from the dumping mechanism.

It will be appreciated that the pivot bollards 23 and their associated sockets in the wing members 28 of the cradle ensure proper alignment of the tracks on the cradle with the tracks leading up to the grain receiving pit when the cradle 10 is lowered to its bridging position. This constitutes an improvement over the prior art where yokes were used on the side walls of the pits which were adapted to receive transverse shafts extending from the cradles. Although the longitudinal position of the cradle onto the pit was normally carried out satisfactorily, it often occurred that when the cradle shafts were lowered into the yokes, the ends of the cradle tracks were offset a certain degree from their adjacent tracks whereby locking of the cradle to the adjacent tracks could not take place. Moreover, such misalignment could end in the derailment of a box car when removed from the dumper.

FIGURES 6 and 10 show the cradle locking devices which serve to clamp securely the ends of the cradle 10 to the well assemblies 25. The suspension arm 50 is mounted at one end to the carriage of the trolley 12 and from its other end is suspended an upper shoe 38 pivotally connected thereto by means of a pin 52. The latter also serves to pivotally connect the upper end of an eccentric rod 40 to the arm 50, the lower end of the rod 40 being pivotally connected to and carrying a lower shoe 37. It will be appreciated that the lower shoe 37 may move longitudinally with respect to the upper shoe 38, arm 50, and trolley 12. Shoes 37 and 38 are mounted to the trolley 12 so as to slidably engage flanges 35' and 39 in the longitudinal channel of the cradle 10 as well as the corresponding flanges 35" and 39' in the well assemblies 25. Actuating pins 40' are mounted in the well assemblies, as shown in FIGURES 1, 3, and 10.

FIGURE 10 discloses that the length of the eccentric rod 40 is such that when the trolley 12 is within the confines of the cradle 10, the lower shoe 37 leads the upper shoe 38. Now, when the end of the trolley 12 is being moved into the well assembly 25, the outer terminal ends of the shoe 37 contacts the actuating pin 40' and the movement into the well assembly 25 of the trolley 12 causes the lower shoe 37, at rest against the pin 40', to be slid backwardly with respect to the outer shoe 38 and arm 50 so that the shoes 37 and 38, by means of the rod 40, expand vertically with respect to one another, as shown in pecked lines in FIGURE 10, so that they jam firmly against their adjacent flanges in the cradle channel and well assemblies to provide a solid bridge therebetween.

When the trolley 12 is moved inwardly into the cradle 10, arm 50 pivots the top shoe 38 with respect to the shoe 37 so that they again assume their relaxed position as shown in FIGURE 10.

A prototype of the present invention has been constructed and tested in operation during various seasons of the year to establish average rates of operation for the machine. With normal ambient temperature above 15° F. minimum, the average rate of unloading of box cars is 11 cars per hour, and peak rates of 15 cars per hour have been achieved. Over 90% of cars are unloaded in about 3½ minutes from start of clamping to end of unclamping. The average rate of unloading is 12 cars an hour, and peak rates of 15 cars an hour have been achieved.

We claim:

1. In an end tilt grain car dumping mechanism including a material receiving pit having load-bearing end walls and side walls for supporting a tiltable cradle structure mounted over said pit, a foundation structure comprising a plurality of spherical pivot members mounted on said side walls and a well assembly disposed in each of said end walls; said well assemblies being adapted to support the ends of lead tracks terminating at said end walls; and a tiltable cradle structure mounted over said pit, said cradle structure including,
    (a) a plurality of wing members extending externally from said cradle to project over said side walls;
    (b) sockets formed in the lower surface of said wing members, each socket being adapted to cooperate with an associated spherical pivot member on the side walls so as to pivotally mount said cradle for tilting;
    (c) said cradle including a longitudinal channel portion in each end thereof;
    (d) a pair of trolleys mounted and movable in said channel and well assemblies; each said trolley having rollers thereon and including a combined car clamp and cradle lock adapted, in a first position, to secure the ends of said cradle to the adjacent well assemblies in said end walls simultaneously clamping said car on the cradle and, in a second position, to free the ends of said cradle from the well assemblies simultaneously unclamping the car from the cradle; the cradle lock of each trolley including movable members suspended therefrom and adapted in said first position, to expand and engage said cradle channel and the associated well assembly;
    (e) a trip device in each well assembly for actuating the movable members to said first position; and
    (f) a plurality of hydraulic cylinders mounted to said pit side walls adjacent the spherical members for raising sequentially each end of the cradle in a tilting operation.

2. A dumping mechanism according to claim 1 wherein each said cradle lock comprises a suspension arm pivotally mounted at one end to said trolley intermediate the rollers thereon; said movable members comprising a first shoe pivotally mounted to the other end of said suspension arm, an eccentric rod connected at one end to said suspension arm, and a second shoe pivotally connected to the other end of said eccentric rod; the first and second shoes being adapted slidably to engage, respectively, upper and lower surfaces of said cradle channel and said well assembly; said trip device comprising a pin mounted in said well assembly adapted, upon movement therein of said trolley, to engage and inhibit movement of said second shoe whereby said eccentric rod and the first shoe will move relative to the second shoe so as to jam said shoes against the cradle channel and the well assembly to form a rigid bridge therebetween.

3. Dumping mechanism according to claim 1 including a rotatable shaft mounted on said cradle for operatively engaging each said trolleys, said shaft having a pillow block pivotally secured to each end thereof adjacent each trolley; each trolley comprising a carriage; a coupler clamp post slidably and pivotally mounted at its lower end to the sides of said carriage and having its upper end interconnected thereto by tie members; a nut mounted in said carriage threadably engaging said shaft whereby, upon rotation thereof, said trolley will be reciprocated in said channel; and a pair of guide members at the lower end of said clamp post adapted for engagement by said pillow block so that when the trolley is moved to said first position by rotation of the shaft acting on said nut, the pillow block will engage the guide members thereby to slide the lower end of said post along said carriage so that the upper end of said post is in position to engage the coupler of a grain car, and, when said trolley is moved to said second position, the pillow block, upon rotation of said shaft, will slide the lower end of said post along said carriage thereby to stow the post within the trolley; the trolley in said first position being disposed entirely within said cradle structure and, in said second position, in a bridging position between said cradle structure and the well assembly.

References Cited by the Examiner

UNITED STATES PATENTS

| | | | |
|---|---|---|---|
| 1,364,808 | 1/21 | Richardson | 214—47 |
| 1,399,484 | 12/21 | Hull | 214—47 |
| 1,793,622 | 2/31 | Kidder | 214—47 |
| 2,797,000 | 6/57 | Winter | 214—47 |
| 2,857,061 | 10/58 | Kostick et al. | 214—47 |

HUGH O. SCHULZ, *Primary Examiner.*

GERALD M. FORLENZA, *Examiner.*